US008386625B2

(12) United States Patent
Shu

(10) Patent No.: US 8,386,625 B2
(45) Date of Patent: Feb. 26, 2013

(54) METHOD AND SYSTEM FOR QUERYING PARAMETER INFORMATION, AND APPARATUS FOR RETURNING PARAMETER INFORMATION

(75) Inventor: Guiming Shu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2532 days.

(21) Appl. No.: 12/492,917

(22) Filed: Jun. 26, 2009

(65) Prior Publication Data

US 2009/0259639 A1 Oct. 15, 2009

Related U.S. Application Data

(63) Continuation of application No. PCT/CN2007/003059, filed on Oct. 26, 2007.

(30) Foreign Application Priority Data

Dec. 28, 2006 (CN) .......................... 2006 1 0170318

(51) Int. Cl.
*G06F 15/16* (2006.01)
(52) U.S. Cl. ......... 709/230; 370/331; 370/469; 455/436
(58) Field of Classification Search .................. 370/254, 370/331, 328; 455/436, 343.4
See application file for complete search history.

(56) References Cited

U.S. PATENT DOCUMENTS

| 7,630,702 | B2 * | 12/2009 | Kim et al. .................. 455/343.4 |
| 7,649,867 | B2 * | 1/2010 | Kim et al. ..................... 370/331 |
| 7,792,081 | B2 * | 9/2010 | Kim et al. ..................... 370/331 |
| 2006/0140150 | A1 * | 6/2006 | Olvera-Hernandez et al. .............................. 370/331 |
| 2006/0187858 | A1 * | 8/2006 | Kenichi et al. ................ 370/254 |
| 2007/0072611 | A1 * | 3/2007 | Feder et al. .................... 455/436 |
| 2007/0191012 | A1 * | 8/2007 | Park et al. ..................... 455/436 |
| 2009/0036132 | A1 | 2/2009 | Liu et al. |
| 2009/0268661 | A1 * | 10/2009 | Ng et al. ....................... 370/328 |

FOREIGN PATENT DOCUMENTS

| CN | 1614937 | 5/2005 |
| CN | 1852615 | 10/2006 |
| CN | 101018397 A | 8/2007 |
| WO | WO-2006011908 | 2/2006 |
| WO | WO 2006/101369 | 9/2006 |

OTHER PUBLICATIONS

English Translation of the PCT Written Opinion of the International Searching Authority for International Application No. PCT/CN2007/003059, mailed Feb. 14, 2008, 3 pgs.
European Patent Office Communication for Application No. 07816672.5, enclosing the extended European search report which includes, pursuant to Rule 62 EPC, the supplementary European search report EPC0 and the European search opinion, dated Jan. 20, 2010, 11 pgs.
"Draft IEEE Standard for Local and Metropolitan Area Networks: Media Independent Handover Services", IEEE P802.21/D03.00, XP 007905347, Dec. 2006, 269 pgs.

(Continued)

*Primary Examiner* — Dustin Nguyen
(74) *Attorney, Agent, or Firm* — Finnegan, Henderson, Farabow, Garrett & Dunner LLP

(57) ABSTRACT

The present invention provides a method and system for querying parameter information, and an apparatus for returning parameter information. The protocol layer that receives a query request establishes a correspondence between an acquired parameter value and a parameter name and returns the parameter value and the corresponding parameter name to the protocol layer that sends the query result. This can decrease the complexity of implementing the query mechanism. In addition, with the present invention, the MIH layer can also notify the upper layer/MIH users/NMS entity of the query result when returning the queried state information to the upper layer/MIH users/NMS entity.

6 Claims, 6 Drawing Sheets

OTHER PUBLICATIONS

"IEEE P802.21/D05.01, Media 1-15 Independent Handover Services, 7. Service Access Points (SAPs) and Primitives", XP002562134, May 2007, 108 pgs.

First Chinese Office Action dated (mailed) Mar. 26, 2012, issued in related Chinese Application No. 200780048712.9 Huawei Technologies C., LTD (15 pages).

Chu, Bing-hua, et al., "Extending of the message mechanism for formal language MSC", Journal of Zhejiang University (Engineering Science), vol. 37, No. 2, Mar. 2003 (6 pages).

Peresse, Mathieu, et al., "MIH Link Parameter Report primitive", IEEE 802.21 Media Independent Handover Services, http://www.ieee802.org/21/, Jan. 9, 2006 (3 pages).

* cited by examiner

METHOD AND SYSTEM FOR QUERYING PARAMETER INFORMATION, AND APPARATUS FOR RETURNING PARAMETER INFORMATION

The present application is a continuation of International Application No. PCT/CN2007/003059, filed on Oct. 26, 2007, which claims the benefit of Chinese Patent Application No. 200610170318.X, filed on Dec. 28, 2006, both of which are hereby incorporated by reference in their entireties.

FIELD OF THE INVENTION

The present invention relates to the communication field, and in particular, to technologies for querying parameter information.

BACKGROUND OF THE INVENTION

With the development of communication technologies, the communication networks of different types coexist in a region. For example, FIG. 1 shows the coexistence of a wireless local area network (WLAN), a worldwide interoperability for microwave access (WiMAX) network, and a cellular network. In addition, multi-mode terminals that can communicate with different networks are developed accordingly. The service areas and service capabilities of different communication networks are different. Therefore, the key technology is to ensure that a mobile terminal can implement seamless handover between different media networks.

At present, the 802.21 protocol defines an architecture for implementing the media independent handover (MIH) service for multi-mode terminals, as shown in FIG. 2. In this architecture, an MIH layer is added between L2 (the link layer) and L3 (the network layer) in the protocol stack of a network entity. At the MIH layer, the interfaces with the upper layer of the protocol stack, the lower layer of the protocol stack, the network management system (NMS), and the media independent handover function (MIHF) entity at the peer end are defined to provide event, command, and information services for multi-mode terminals to implement seamless handover between different media networks.

When providing services for multi-mode terminals to implement seamless handover between different media networks, the upper layer/MIH users/NMS entity needs to query the bottom layer/link layer for parameters.

The conventional technology related to the present invention provides a method for querying parameter information. The query process is illustrated in FIG. 3 and described below:

The upper layer/MIH users/NMS entity sends an MIH_NMS_Get_State.request command to the MIH layer and specifies one or more parameters to be queried through the "StateInformationRequestList" which is a parameter list of state information requested. Table 1 defines the "StateInformationRequestList" parameter.

TABLE 1

| Name | Type | Valid Range | Description |
|---|---|---|---|
| StateInformationResponseList | List | N/A | List of the state information |

After receiving the MIH_NMS_Get_State.request command sent from the upper layer/MIH users/NMS entity and finding that certain link layer parameters need to be queried, the MIH layer uses a Link_Get_Parameters.request command to initiate a link parameter query request to the bottom layer/link layer and uses a list parameter "LinkParameterList" in the Link_Get_Parameters.request command to specify one or more link parameters to be queried at the link layer. Table 2 defines the "LinkParameterList" parameter.

TABLE 2

| Name | Type | Valid Range | Description |
|---|---|---|---|
| LinkParameterList | List | N/A | A list of link parameters |

After receiving the link parameter query request sent from the MIH layer, the bottom layer/link layer acquires the current values of the link parameters to be queried, uses a Link_Get_Parameters.confirm command and the "LinkParameterList" parameter in the command to return the current values to the MIH layer, and uses an enumerated parameter "Status" in the Link_Get_Parameters.confirm command to return the status ("Success" or "Error") of the result of querying link parameters to the MIH layer. Table 3 defines the "LinkParameterList" and "Status" parameters.

TABLE 3

| Name | Type | Valid Range | Description |
|---|---|---|---|
| LinkParameterList | List | N/A | A list of link parameters |
| Status | Enumerated | Success Error | Status of operation |

After receiving the Link_Get_Parameters.confirm command sent from the link layer, the MIH layer parses the link parameter values from the "LinkParameterList" parameter in the command and returns the link parameter values to the NMS through an MIH_NMS_Get_State.confirm command and a "StateInformationResponseList" parameter in the command. Table 4 defines the "StateInformationResponseList" parameter.

TABLE 4

| Name | Type | Valid Range | Description |
|---|---|---|---|
| StateInformationResponseList | List | N/A | List of the state information |

The method in the conventional technology has the following defects:

1. In the conventional technology, the "LinkParameterList" parameter in Link_Get_Parameters.request and Link_Get_Parameters.confirm commands is uniformly defined as "a list of link parameters". In addition, according to the current definition, the "LinkParameterList" parameter in the Link_Get_Parameters.request command is a parameter list that contains "RSSI", "SNR", "C/I", "BER", "PER", and "Link Data Rate" elements and the "LinkParameterList" parameter in the Link_Get_Parameters.confirm command is a list that contains the values of the preceding parameters. In such a query mechanism, to query the bottom layer/link layer for parameters, the MIH layer needs to ensure that the order of the elements in the "LinkParameterList" parameter in the Link_Get_Parameters.request command is the same as that of the elements in the "LinkParameterList" parameter in the Link_Get_Parameters.confirm command and thus to ensure that the parameter values in the LinkParameterList parameter in the Link_Get_Parameters.confirm command correspond to the parameter names in the "LinkParameterList" parameter in the Link_Get_Parameters.request command. Otherwise, the correspondence between the returned parameter values in the Link_Get_Parameters.confirm command and the parameter names cannot be determined. Therefore, it is complex to implement the query mechanism in the prior art.

2. In the conventional technology, the "StateInformationRequestList" parameter in the MIH_NMS_Get_State.Request command and the "StateInformationResponseList" parameter in the MIH_NMS_Get_State.confirm command are both defined as "list of the state information". In addition, according to the current definition, the "StateInformationRequestList" parameter in the MIH_NMS_Get_State.Request command is a list that contains state information and the "StateInformationResponseList" parameter in the MIH_NMS_Get_State.confirm command is a list that contains the corresponding state values. In such a query mechanism, to query the MIH layer for parameters, the upper layer/MIH users/NMS entity needs to ensure that the order of the elements in the "StateInformationRequestList" parameter in the MIH_NMS_Get_State.Request command is the same as that of the elements in the "StateInformationResponseList" parameter in the MIH_NMS_Get_State.confirm command and thus to ensure that the state values in the "StateInformationResponseList" parameter in the MIH_NMS_Get_State.confirm command correspond to the state names in the "StateInformationRequestList" parameter in the MIH_NMS_ Get_State.Request command. Otherwise, the correspondence between the returned state values in the MIH_NMS_Get_State.confirm command and the state names cannot be determined. Therefore, it is complex to implement the query mechanism in the prior art.

3. In the conventional technology, the MIH_NMS_Get_State.confirm command does not contain a parameter such as "Status" used for the MIH layer to return the status of the query result to the upper layer/MIH users/NMS entity. As a result, the upper layer/MIH users/NMS entity does not know the status ("success" or "error") of the result of state information query and thus fails to determine whether the returned state value is valid.

SUMMARY OF THE INVENTION

Embodiments of the present invention provide a method and system for querying parameter information, and an apparatus for returning parameter information. The present invention can decrease the complexity of implementing the query mechanism.

The embodiments of the present invention provide the following technical solution.

An embodiment of the present invention provides a method for querying parameter information. The method includes:

A method for querying parameter information, characterized in comprising:

establishing, by a protocol layer that receives a query request, a correspondence between a parameter value and a parameter name of the parameter, and returning the parameter value and the parameter name to a protocol layer that sends the query request.

An embodiment of the present invention provides a method for querying link parameter information. The method includes:

obtaining, by a bottom layer/link layer, a link parameter value according to a link parameter name of the link parameter;

establishing, by the bottom layer/link layer, a correspondence between the link parameter value and the link parameter name, and returning the link parameter value and the link parameter name to a media independent handover, MIH, layer.

An embodiment of the present invention provides a method for querying state information. The method includes:

obtaining, by a media independent handover, MIH, layer, a state value according to a state name of the state;

establishing, by the MIH layer, a correspondence between the state value and the state name, and returning the state value and the state name to an upper layer/MIH users/network management system, NMS, entity.

An embodiment of the present invention provides a system for querying parameter information. The system includes a bottom layer/link layer and an MIH layer, where:

An embodiment of the present invention provides an apparatus for returning parameter information. The apparatus includes:

a first relation establishing unit, adapted to obtain a link parameter value according to a query request, and establish a correspondence between the link parameter value and a link parameter name of the link parameter; and a first information transmitting unit, adapted to return the link parameter value and the link parameter name to an MIH layer.

An embodiment of the present invention provides a system for querying parameter information. The system includes an MIH layer and an upper layer/MIH users/NMS entity, where:

the MIH layer is adapted to: acquire a state value according to a query result sent from a protocol layer that receives a query request, establish a correspondence between the state value and a state name of the state, and return the state value and the state name to the upper layer/MIH users/NMS entity.

An embodiment of the present invention provides an apparatus for returning parameter information. The apparatus includes:

a second relation establishing unit, adapted to: acquire a state value according to a query result sent from a protocol layer that receives a query request and establish a correspondence between the state value and a state name of the state; and a second information transmitting unit, adapted to return the state value and the state name to an upper layer/MIH users/NMS entity.

As shown in the specific solution provided in embodiments of the present invention, the protocol layer receiving a query request establishes a correspondence between an acquired parameter value and a parameter name and returns the parameter value and the corresponding parameter name to the protocol layer that sends the query request. Therefore, the embodiments of the present invention can ensure the correspondence between state values and state names without depending on the consistency of element orders in the "StateInformationRequestList" and "StateInformationResponseList" parameters in the interactive commands between the upper layer/MIH users/NMS entity and the MIH layer, or can ensure the correspondence between link parameter values and link parameter names without depending on the consistency of element orders in the "LinkParameterList" parameters in the interactive commands between the MIH layer and the bottom layer/link layer. This can decrease the complexity of implementing the query mechanism.

DETAILED DESCRIPTION OF THE EMBODIMENTS

Figure 1:
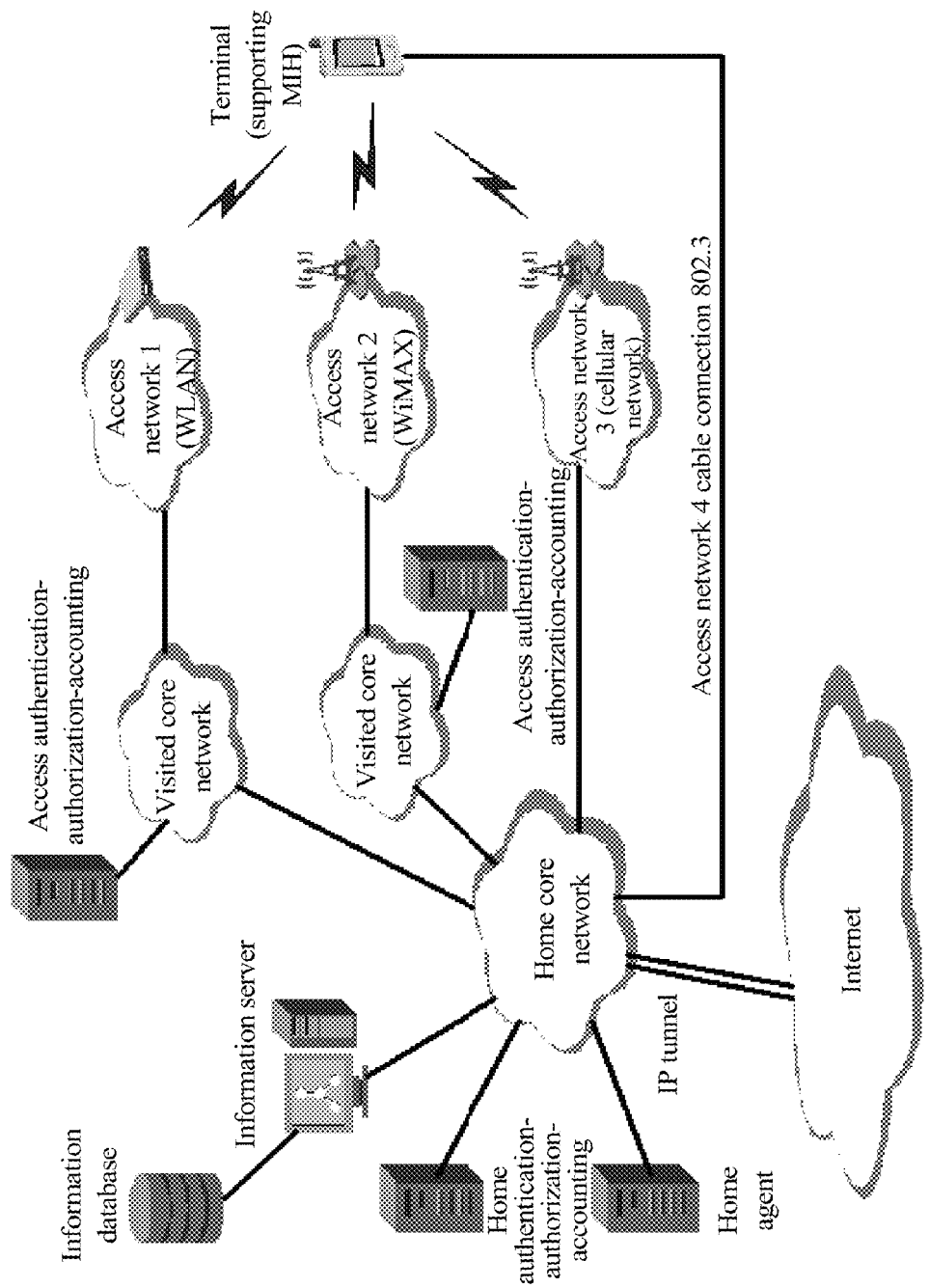
FIG. 1 shows the coexistence of different networks in the prior part.
Figure 2:
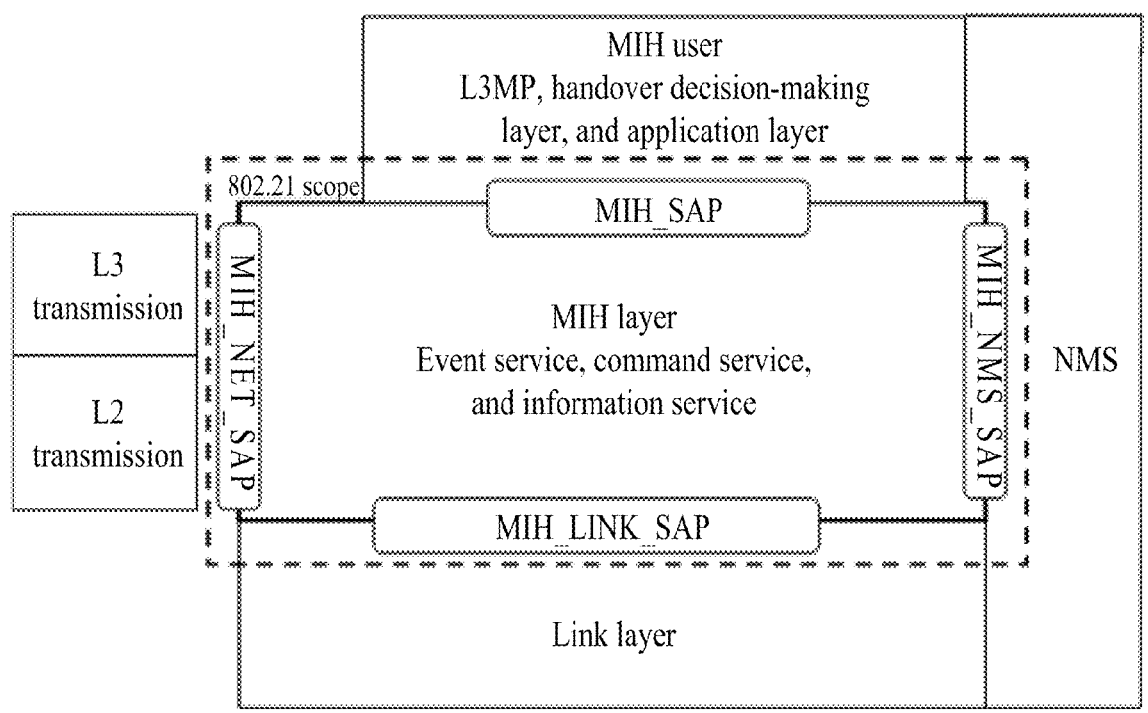
FIG. 2 shows an architecture for implementing the media independent handover (MIH) service for multi-mode terminals in the 802.21 protocol in the conventional technology.
Figure 3:
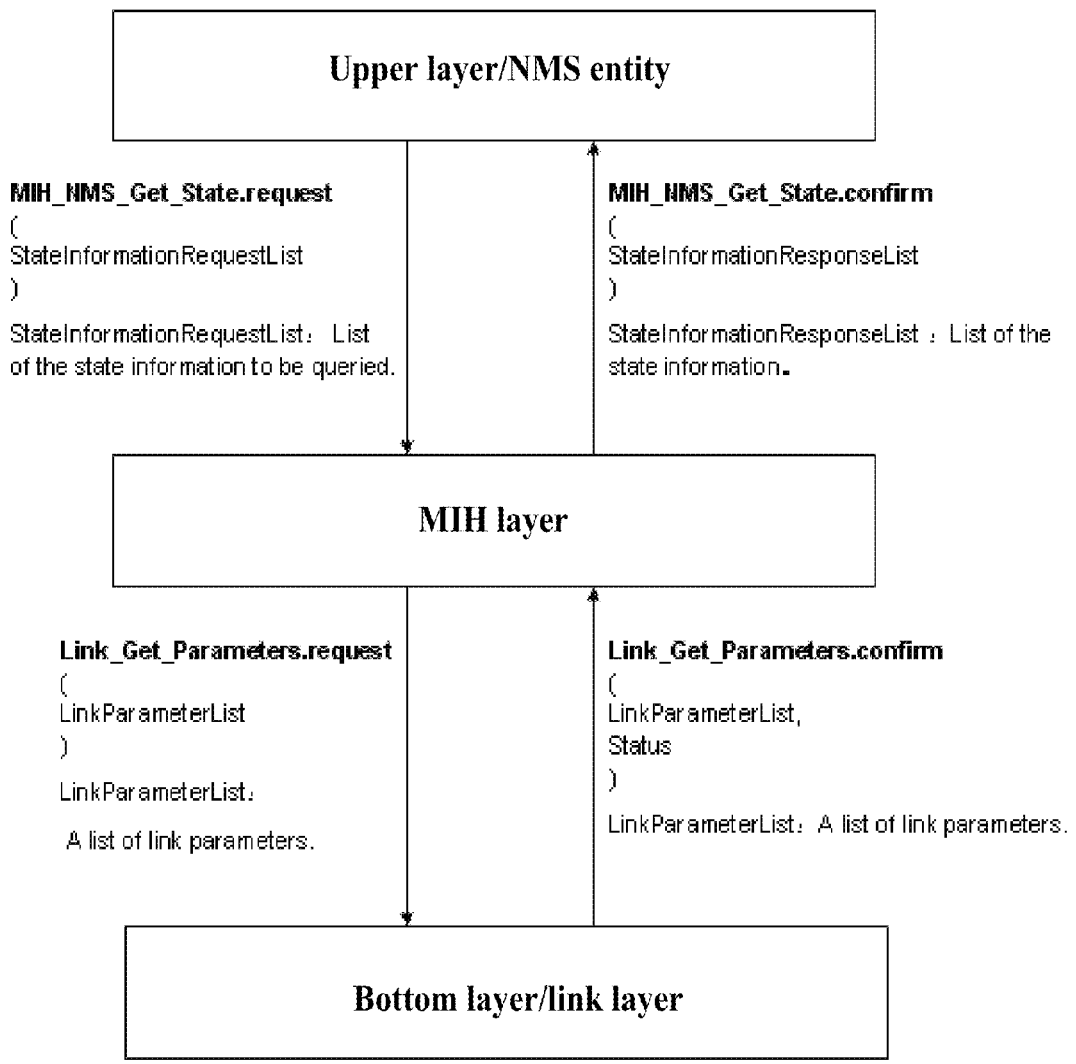
FIG. 3 shows a flowchart for querying parameter information in the prior art.
Figure 4:
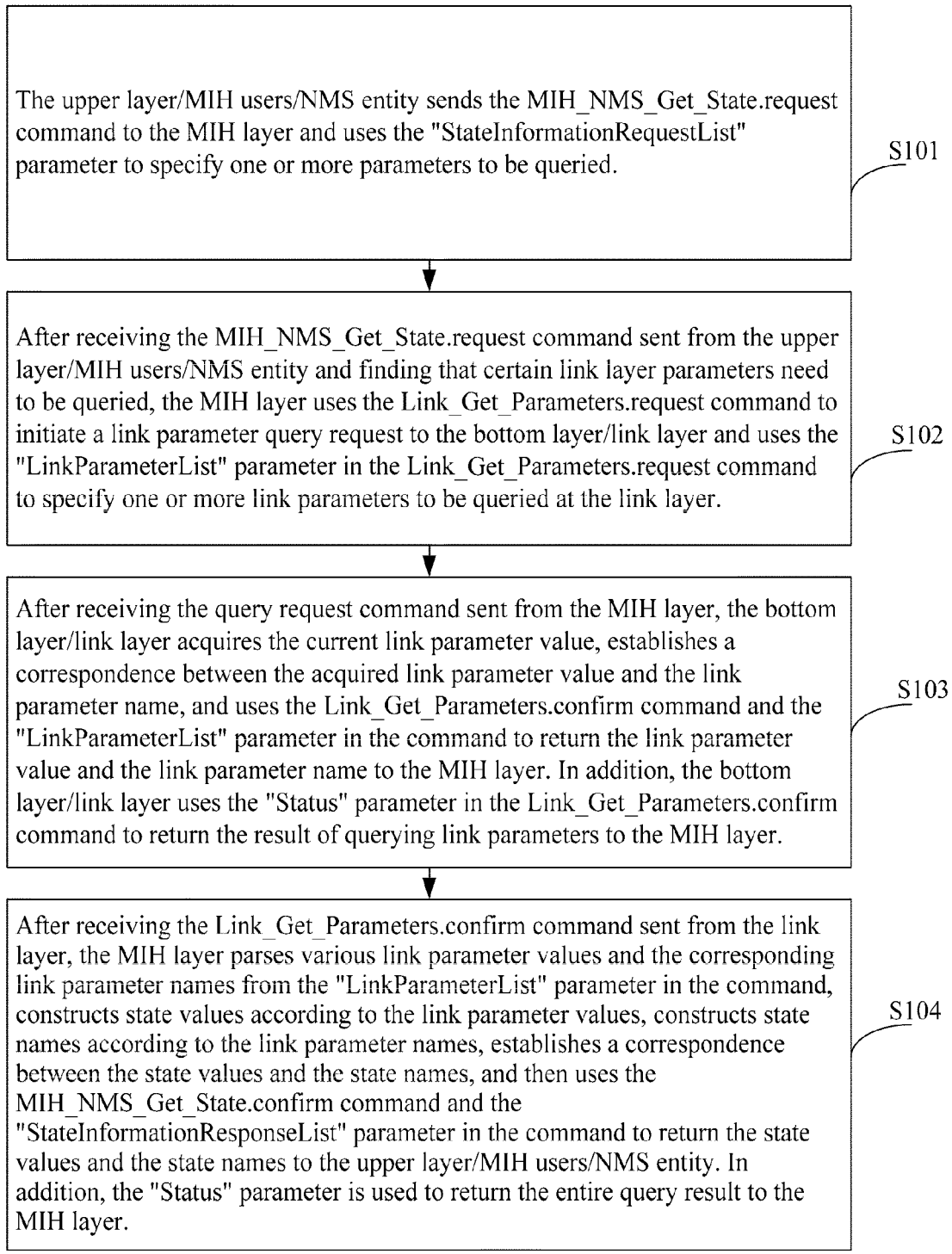
FIG. 4 shows a flowchart of a first embodiment of the present invention.

A first embodiment of the present invention provides a method for querying parameter information. In the method, after acquiring a link parameter value, the bottom layer/link layer establishes a correspondence between the link parameter value and a corresponding link parameter name and returns the link parameter value and the corresponding link parameter name to the MIH layer; and after receiving a result of querying link parameter values from the bottom layer/link layer, the MIH layer acquires a state value according to the query result, establishes a correspondence between the acquired state value and a state name, and returns the state value and the corresponding state name to the upper layer/MIH users/NMS entity. As shown in FIG. 4, the specific implementation process includes the following steps:

Step 101: The upper layer/MIH users/NMS entity sends the MIH_NMS_Get_State.request command to the MIH layer and uses the "StateInformationRequestList" parameter to specify one or more parameters to be queried.

For the definitions of the "StateInformationRequestList" parameter, see Table 1.

Step 102: After receiving the MIH_NMS_Get_State.request command sent from the upper layer/MIH users/NMS entity and finding that certain link layer parameters need to be queried, the MIH layer uses the Link_Get_Parameters.request command to initiate a link parameter query request to the bottom layer/link layer and uses the "LinkParameterList" parameter in the Link_Get_Parameters.request command to specify one or more link parameters to be queried at the link layer.

For the definitions of the "LinkParameter List" parameter, see Table 2.

Step 103: After receiving the query request command sent from the MIH layer, the bottom layer/link layer acquires the current link parameter value, establishes a correspondence between the acquired link parameter value and the link parameter name, and uses the Link_Get_Parameters.confirm command and the "LinkParameterList" parameter in the command to return the link parameter value and the corresponding link parameter name to the MIH layer. In addition, the bottom layer/link layer uses the "Status" parameter in the Link_Get_Parameters.confirm command to return the status ("Success" or "Error") of the result of querying link parameters to the MIH layer.

Through step 103, the link parameter value and the corresponding link parameter name can be returned to the MIH layer. Thus, a first defect in the conventional technology is overcome.

In specific implementation, the link parameter values and the corresponding link parameter names may form an orderly duplet. After that, the duplet is encapsulated to the "LinkParameterList" parameter and then is transmitted to the MIH layer with the "Status" parameter through the Link_Get_Parameters.confirm command. Table 5 defines the "LinkParameterList" and "Status" parameters.

TABLE 5

| Name | Type | Valid Range | Description |
|---|---|---|---|
| LinkParameterList | List | N/A | A list of a pair of {link parameters; link parameter values} |
| Status | Enumerated | Success; Error | Status of operation |

The following primitive can be used:

Link_Get_Parameters.confirm (
    LinkParameterList,
    Status
)

Step 104: After receiving the Link_Get_Parameters.confirm command sent from the link layer, the MIH layer parses various link parameter values and the corresponding link parameter names from the "LinkParameterList" parameter in the command, constructs state values according to the link parameter values, constructs state names according to the link parameter names, establishes a correspondence between the state values and the state names, and then uses the MIH_NMS_Get_State.confirm command and the "StateInformationResponseList" parameter in the command to return the state values and the corresponding state names to the upper layer/MIH users/NMS entity. In addition, when the state values and the corresponding state names are returned, the "Status" parameter is used to return the status ("Success" or "Error") of the entire query result to the MIH layer.

Through step 104, the state value and the corresponding state name can be returned to the upper layer/MIH users/NMS entity. Thus, a second defect in the prior art is overcome.

In step 104, when the state values and the corresponding state names are returned, the "Status" parameter may also be used to return the status ("Success" or "Error") of the result of the entire query to the MIH layer to overcome a third defect in the conventional technology.

In specific implementation, the state values and the corresponding state names can form an orderly duplet. After that, the duplet is encapsulated to the "StateInformationResponseList" parameter and then is transmitted to the upper layer/MIH users/NMS entity with the "Status" parameter through the MIH_NMS_Get_State.confirm command. Table 6 defines the "StateInformationResponseList" and "Status" parameters.

TABLE 6

| Name | Type | Valid Range | Description |
|---|---|---|---|
| StateInformationResponseList | List | N/A | List of a pair of {state information; state value} |
| Status | Enumerated | Success; Error | Status of operation |

The following primitive can be used:

```
MIH_NMS_Get_State. confirm(
                         StateInformationRequestList
                         Status
                       )
```

A second embodiment of the present invention provides a second method for querying parameter information. In this method, the MIH layer uses the method in the conventional technology to further return corresponding information to the upper layer/MIH users/NMS entity after receiving the result of querying link parameter values from the bottom layer/link layer. The specific implementation process is as follows:

Firstly, step 101 to step 103 are performed with reference to the first embodiment of the present invention.

Secondly, after receiving the result of querying link parameter values from the bottom layer/link layer, the MIH layer uses the method in the conventional technology to further return the corresponding information to the upper layer/MIH users/NMS entity. That is, after receiving the Link_Get_Parameters.confirm command sent from the link layer, the MIH layer parses various link parameter values from the "LinkParameterList" parameter, constructs state values according to the link parameter values, and then uses the MIH_NMS_Get_State.confirm command and the "StateInformationResponseList" parameter in the command to return the state values and the corresponding state names to the upper layer/MIH users/NMS entity. For the definitions of the "StateInformationResponseList" parameter, see Table 4.

A third embodiment of the present invention provides a third method for querying parameter information. In this method, after acquiring a link parameter value, the bottom layer/link layer uses the method in the conventional technology to return the link parameter value to the MIH layer. The specific implementation process is as follows:

Firstly, step 101 and step 102 are performed with reference to the first embodiment of the present invention.

Secondly, after acquiring the link parameter value, the bottom layer/link layer uses the method in the conventional technology to return the link parameter value to the MIH layer. That is, the bottom layer/link layer uses the Link_Get_Parameters.confirm command and the "LinkParameterList" parameter in the command to return the acquired link parameter value to the MIH layer and uses the "Status" parameter to return the status of the result of querying link parameters to the MIH layer.

Finally, the MIH layer constructs state values according to the result of querying link parameter values from the bottom layer/link layer, establishes a correspondence between the constructed state values and the corresponding state names, and returns the state values and the corresponding state names to the upper layer/MIH users/NMS entity. The specific implementation is the same as step 104 in the first embodiment of the present invention and is not described further.

A fourth embodiment of the present invention provides a fourth method for querying parameter information. In this method, after receiving the MIH_NMS_Get_State.request command sent from the upper layer/NMS entity and finding that one or more parameters specified by the "StateInformationRequestList" parameter are not at the bottom layer/link layer but at other protocol layers that receive the query request, the MIH layer sends relevant signaling to those protocol layers. After receiving the corresponding query result returned by other protocol layers, the MIH layer constructs state values according to the query result and returns the state values and the corresponding state names to the upper layer/MIH users/NMS entity. The specific implementation is the same as step 104 in the first embodiment of the present invention and is not described further.

The preceding embodiment uses the "Status" parameter in the Link_Get_Parameters.confirm command defined in the P802.21 protocol. The enumerated values of the parameter are "Success" and "Error". Obviously, the query result is based on the query for all parameters and cannot reflect the query for each parameter. To overcome this defect, the "LinkParameterList" parameter in the Link_Get_Parameters.confirm command and the "StateInformationResponseList" parameter in the MIH_NMS_Get_State.confirm command are defined as follows:

The "LinkParameterList" parameter in the Link_Get_Parameters.confirm command is defined as a list containing orderly triplets of a link parameter, a link parameter value, and status of the query result of the parameter, such as {link parameter, parameter value, status of query result}. In this way, when using the Link_Get_Parameters.confirm command to return the parameter query result to the MIH layer, the bottom layer/link layer may also return each link parameter name, the corresponding link parameter value, and the status of the query result of the link parameter to the MIH layer.

In the same way, the "StateInformationResponseList" parameter in the MIH_NMS_Get_State.confirm command that the MIH layer sends to the upper layer/MIH users/NMS entity is defined as a list containing orderly triplets of a state name, a state value, and status of the query result of the state name, such as {state information, state value, status of query result}. In this way, when using the MIH_NMS_Get_State.confirm command to return a parameter information query result to the upper layer/MIH users/NMS entity, the MIH layer may also return each state name, the corresponding state value, and the status of the query result of the state name to the upper layer/MIH users/NMS entity.

Figure 5:
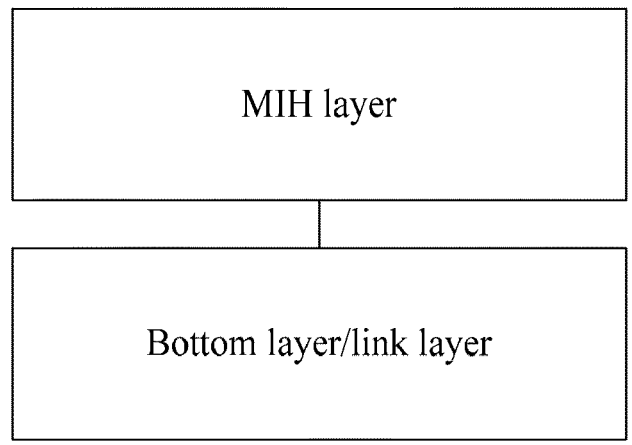
FIG. 5 shows a structure of a system according to a fifth embodiment of the present invention.

A fifth embodiment of the present invention provides a system for querying parameter information. As shown in FIG. 5, the system includes a bottom layer/link layer and an MIH layer.

After acquiring a link parameter value, the bottom layer/link layer establishes a correspondence between the link parameter value and a corresponding link parameter name and returns the link parameter value and the corresponding link parameter name to the MIH layer. The specific implementation process is the same as relevant descriptions in the embodiments of the method and is not described further.

When returning the link parameter value and the corresponding link parameter name to the MIH layer, the bottom layer/link layer also returns the status of the query result of each link parameter value to the MIH layer. The specific implementation process is the same as relevant descriptions in the embodiments of the method and is not described further.

Figure 6:
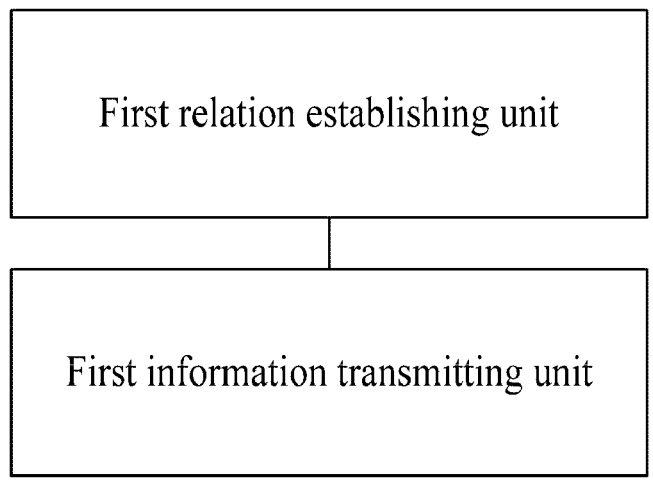
FIG. 6 shows a structure of an apparatus according to a sixth embodiment of the present invention.

A sixth embodiment of the present invention provides an apparatus for returning parameter information. As shown in FIG. 6, the apparatus includes a first relation establishing unit and a first information transmitting unit.

The first relation establishing unit acquires a link parameter value corresponding to a link parameter name to be queried, establishes a correspondence between the link parameter value and the link parameter name, and then sends the link parameter value and the link parameter name to the first information transmitting unit. The specific implementation process is the same as relevant descriptions in the embodiments of the method and is not described further.

The first relation establishing unit also establishes a correspondence between the status of the query result of each link parameter value and the link parameter value and sends the status of the query result and the link parameter value to the first information transmitting unit. The specific implementation process is the same as relevant descriptions in the embodiments of the method and is not described further.

The first information transmitting unit returns the link parameter value and the corresponding link parameter name to the MIH layer. In addition, when returning the link parameter value and the corresponding link parameter name to the MIH layer, the first information transmitting unit may also return the status of the query result of each link parameter value to the MIH layer. The specific implementation process is the same as relevant descriptions in the embodiments of the method and is not described further.

Figure 7:
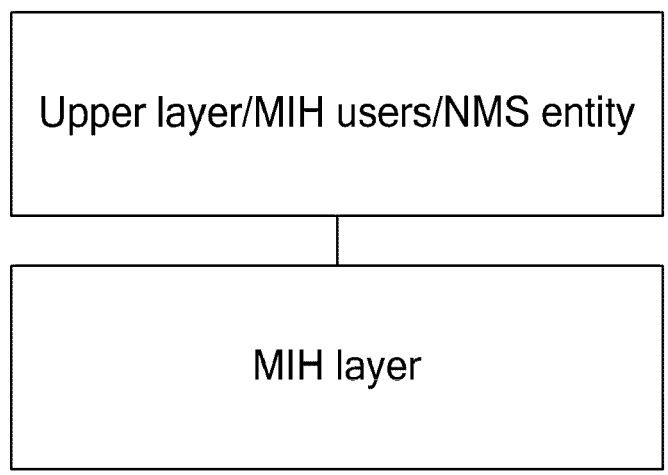
FIG. 7 shows a structure of a system according to a seventh embodiment of the present invention.

A seventh embodiment of the present invention provides a system for querying parameter information. As shown in FIG. 7, the system includes an MIH layer and an upper layer/MIH users/NMS entity.

After receiving a query result sent from a protocol layer that receives a query request, the MIH layer constructs a state value according to the query result, establishes a correspondence between the state value and a corresponding state name, and returns the state value and the corresponding state name to the upper layer/MIH users/NMS entity. The specific implementation process is the same as relevant descriptions in the embodiments of the method and is not described further.

When returning the state value and the corresponding state name to the upper layer/MIH users/NMS entity, the MIH layer may also return the status of the entire query result. The specific implementation process is the same as relevant descriptions in the embodiments of the method and is not described further; or when returning the state value and the corresponding state name to the upper layer/MIH users/NMS entity, the MIH layer may also return the status of the query result of each state to the upper layer/MIH users/NMS entity. The specific implementation process is the same as relevant descriptions in the embodiments of the method and is not described further.

Figure 8:
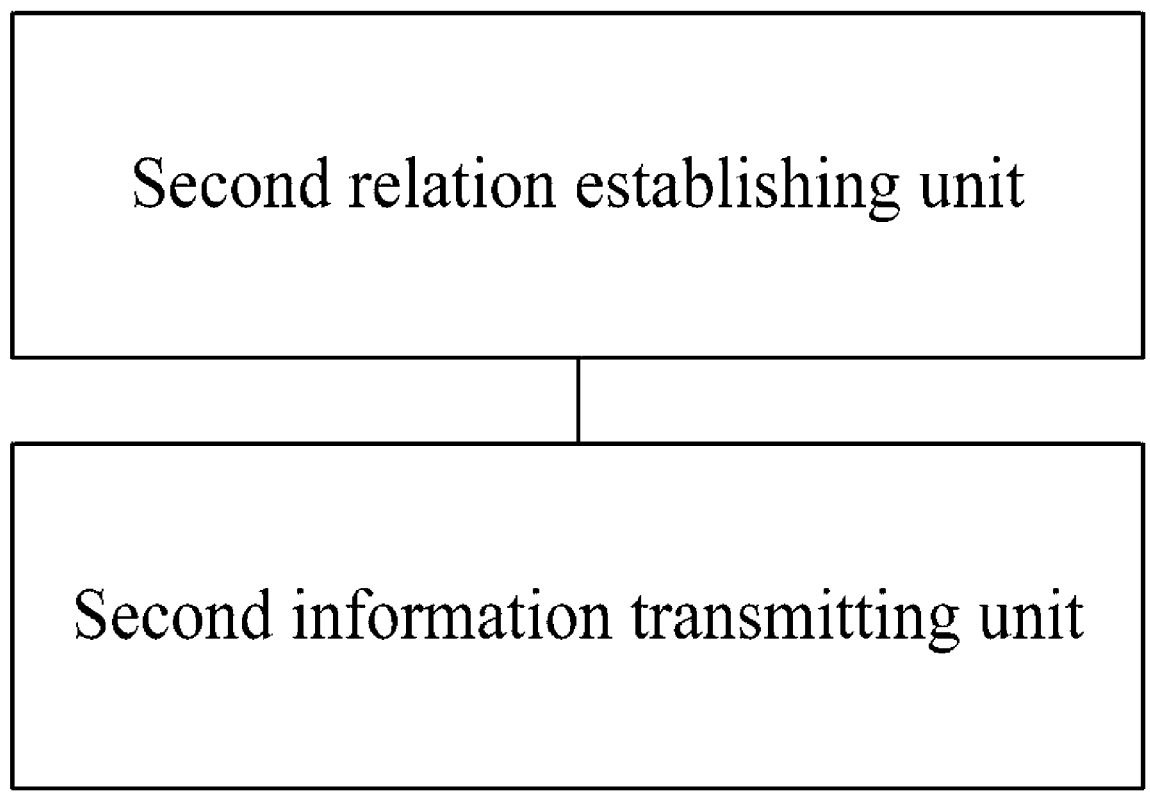
FIG. 8 shows a structure of an apparatus according to an eighth embodiment of the present invention.

An eighth embodiment of the present invention provides an apparatus for returning parameter information. As shown in FIG. 8, the apparatus includes a second relation establishing unit and a second information transmitting unit.

The second relation establishing unit acquires a query result sent from a protocol layer that receives a query request, constructs a state value according to the query result, establishes a correspondence between the state value and a corresponding state name, and sends the state value and the corresponding state name to the second information transmitting unit. The specific implementation process is the same as relevant descriptions in the embodiments of the method and is not described further.

The second relation establishing unit may also establish a correspondence between the status of the entire query result and the query operation. The specific implementation process is the same as relevant descriptions in the embodiments of the method and is not described further; or the second relation establishing unit establishes a correspondence between the status of the query result of each state and each state name or state value, and sends the status of the query result and state name or state value to the second information transmitting unit. The specific implementation process is the same as relevant descriptions in the embodiments of the method and is not described further.

The second information transmitting unit returns the state value and the corresponding state name to the upper layer/MIH users/NMS entity. The specific implementation process is the same as relevant descriptions in the embodiments of the method and is not described further.

When returning the state value and the corresponding state name to the upper layer/MIH users/NMS entity, the second information transmitting unit may also return the status of the entire query result to the upper layer/MIH users/NMS entity; or when returning the state value and the corresponding state name to the upper layer/MIH users/NMS entity, the second information transmitting unit may also return the status of the query result of each state value to the upper layer/MIH users/NMS entity. The specific implementation process is the same as relevant descriptions in the embodiments of the method and is not described further.

As shown in the preceding embodiments, the protocol layer that acquires a query result can return the query result and the corresponding parameter name at the same time. Therefore, the present invention can ensure the correspondence between state values and state names without depending on the consistency of element orders in the "StateInformationRequestList" and "StateInformationResponseList" parameters in the interactive commands between the upper layer/MIH users/NMS entity, or can ensure the correspondence between link parameter values and link parameter names without depending on the consistency of element orders in the "LinkParameterList" parameters in the interactive commands between the MIH layer and the bottom layer/link layer. This can decrease the complexity of implementing the query mechanism.

In addition, adding the "Status" parameter to the MIH_NMS_Get_State.confirm command enables the MIH layer to return the state information query result to the NMS and notify the upper layer/MIH users/NMS entity of the status of the query result at the same time.

It is apparent that those skilled in the art can make various modifications and variations to the invention without departing from the spirit and scope of the invention. The present invention is intended to cover these modifications and variations provided that they fall in the scope of protection defined by the following claims or their equivalents.

What is claimed is:

1. A method for querying parameter information, comprising:
　　receiving, by a first protocol layer of a terminal, a query request for a plurality of parameters from a second protocol layer of the terminal;
　　obtaining, by the first protocol layer of the terminal, parameter values of the plurality of parameters according to the query request;
　　establishing, by the first protocol layer of the terminal, a first correspondence between a parameter value and a parameter name corresponding to each parameter of the plurality of parameters; and
　　returning, by the first protocol layer of the terminal, the parameter value and the parameter name corresponding to each parameter of the plurality of parameters to the second protocol layer of the terminal according to the first correspondence;
　　returning, by the first protocol layer of the terminal, status of query result of each parameter of the plurality of parameters to the second protocol layer of the terminal, wherein the second protocol layer of the terminal, after receiving the parameter value and the parameter name corresponding to each parameter of the plurality of parameters sent from the first protocol layer of the terminal according to the query request of the second protocol layer of the terminal, acquiring a state value according to the status of query result of each parameter of the plurality of parameters; establishing a second correspondence between the state value and the parameter name corresponding to each parameter of the plurality of parameters; and returning the state value and the parameter name corresponding to each parameter of the plurality of parameters to a third protocol layer of the terminal according to the second correspondence, wherein the third protocol layer of the terminal is any one of: an upper layer, MIH users, or a network management system (NMS) entity.

2. The method of claim 1, wherein,
the first protocol layer of the terminal is any one of: bottom layer or link layer;
the second protocol layer of the terminal is a media independent handover (MIH) layer; and
the parameter value of each parameter of the plurality of parameters is a link parameter value, and the parameter name of each parameter of the plurality of parameters is parameter name of the link parameter.

3. The method of claim 1, wherein the first protocol layer of the terminal,
after the obtaining a parameter value of each parameter of the plurality of parameters according to the query request;
returning status of entire query result of the plurality of parameters to the second protocol layer of the terminal.

4. A system having memory and processor for querying parameter information, comprising:
a first protocol layer of a terminal, adapted to receive a query request for a plurality of parameters from a second protocol layer of the terminal,
obtain parameter values of the plurality of parameters according to the query request,
establish a first correspondence between a parameter value and a parameter name corresponding to each parameter of the plurality of parameters, send the parameter value and the parameter name corresponding to each parameter of the plurality of parameters according to the first correspondence, and
send status of query result of each parameter of the plurality of parameters; and
a second protocol layer of the terminal, adapted to receive the parameter value and the parameter name according to the first correspondence and receive status of query result of each parameter of the plurality of parameters;
the second protocol layer is further adapted to acquiring a state value according to the status of query result of each parameter of the plurality of parameters after receiving the parameter value and the parameter name corresponding to each parameter of the plurality of parameters sent from the first protocol layer of the terminal according to the query request of the second protocol layer of the terminal, establish a second correspondence between the state value and the parameter name corresponding to each parameter of the plurality of parameters, and return the state value and the parameter name corresponding to each parameter of the plurality of parameters to the third protocol layer according to the second correspondence.

5. The system of claim 4, wherein:
the first protocol layer of the terminal is any one of: bottom layer or link layer;
the second protocol layer of the terminal is an MIH layer;
the parameter value is a link parameter value, and the parameter name is a parameter name of the link parameter; and
the first protocol layer of the terminal is further adapted to receive a query request from the second protocol layer of the terminal and obtain the link parameter value according to the query request before establishing the first correspondence.

6. An apparatus having memory and processor for returning parameter information, comprising:
a first relation establishing unit of a terminal, adapted to obtain a link parameter value of each parameter of a plurality of parameters according to a query request, and establish a correspondence between the link parameter value and a link parameter name of the link parameter; and
an first information transmitting unit of the terminal, adapted to return the link parameter value and the link parameter name to a MIH layer according to the correspondence;
wherein the first relation establishing unit of the terminal is further adapted to establish a first correspondence between status of query result of each link parameter of the query request and the link parameter name or the link parameter value; and
the first information transmitting unit of the terminal is further adapted to return the status of the query result of each link parameter value to the MIH layer according to the first correspondence; and
a second relation establishing unit of a terminal, adapted to acquire state values of a plurality of states according to a query result sent from a protocol layer that receives a query request and establish a second correspondence between a state value of each state of the plurality of states and a parameter name corresponding to each parameter of the plurality of parameters; and
an second information transmitting unit of the terminal, adapted to return the state value and the parameter name to a protocol layer according to the second correspondence;
wherein the protocol layer is any one of: an upper layer, MIH users, or a NMS entity.

* * * * *